(12) United States Patent
Suzuki

(10) Patent No.: US 10,922,130 B2
(45) Date of Patent: Feb. 16, 2021

(54) INFORMATION PROCESSING DEVICE FOR APPLYING CHANGES TO A TASK OF A PROCESS FLOW WHEN A DYNAMICALLY CHANGEABLE FLAG IS ATTACHED TO THE TASK

(71) Applicant: FUJI XEROX CO., LTD., Tokyo (JP)

(72) Inventor: Takayuki Suzuki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 354 days.

(21) Appl. No.: 15/440,257

(22) Filed: Feb. 23, 2017

(65) Prior Publication Data
US 2018/0046496 A1   Feb. 15, 2018

(30) Foreign Application Priority Data

Aug. 15, 2016 (JP) .............................. JP2016-159259

(51) Int. Cl.
*G06F 9/48* (2006.01)
*G06F 9/52* (2006.01)

(52) U.S. Cl.
CPC .............. *G06F 9/4843* (2013.01); *G06F 9/52* (2013.01)

(58) Field of Classification Search
CPC ................................. G06F 9/4843; G06F 9/52
See application file for complete search history.

(56) References Cited

U.S. PATENT DOCUMENTS

| 10,218,565 | B2 * | 2/2019 | Forsberg | H04L 41/0803 |
|---|---|---|---|---|
| 2007/0221085 | A1 | 9/2007 | Hashizume | |
| 2007/0226746 | A1 * | 9/2007 | Osaka | H04N 1/00915 |
| | | | | 718/106 |
| 2009/0174897 | A1 * | 7/2009 | Sato | H04N 1/00411 |
| | | | | 358/1.15 |
| 2011/0075210 | A1 * | 3/2011 | Fukasawa | H04N 1/00 |
| | | | | 358/1.15 |
| 2011/0125781 | A1 * | 5/2011 | Kasahara | H04N 1/00244 |
| | | | | 707/769 |
| 2017/0235757 | A1 * | 8/2017 | Kee | G06F 16/18 |
| | | | | 707/822 |

FOREIGN PATENT DOCUMENTS

| JP | 2007-164544 A | 6/2007 |
|---|---|---|
| JP | 2007-257584 A | 10/2007 |
| JP | 2009-164972 A | 7/2009 |

OTHER PUBLICATIONS

Jan. 28, 2020 Office Action issued in Japanese Patent Application No. 2016-159259.

* cited by examiner

*Primary Examiner* — Meng Ai T An
*Assistant Examiner* — Willy W Huaracha
(74) *Attorney, Agent, or Firm* — Oliff PLC

(57) ABSTRACT

An information processing device includes a confirmation unit and an application unit. If a changeable flag is attached to a process flow, the confirmation unit confirms whether or not a change exists in a master of the process flow. If the confirmation unit confirms that a change exists in the master, the application unit applies the change to the process flow that is to be executed.

15 Claims, 11 Drawing Sheets

FIG. 4

| | | |
|---|---|---|
| 410 — | JOB FLOW ID | |
| 415 — | MASTER FLAG | |
| 420 — | NUMBER OF TASKS | |
| 425 — | DYNAMICALLY CHANGEABLE FLAG POSITION | |
| 430 — 432 — | TASK | TASK ID | |
| 434 — | | PREVIOUS TASK ID | |
| 436 — | | NEXT TASK ID | |
| | ⋮ | ⋮ |

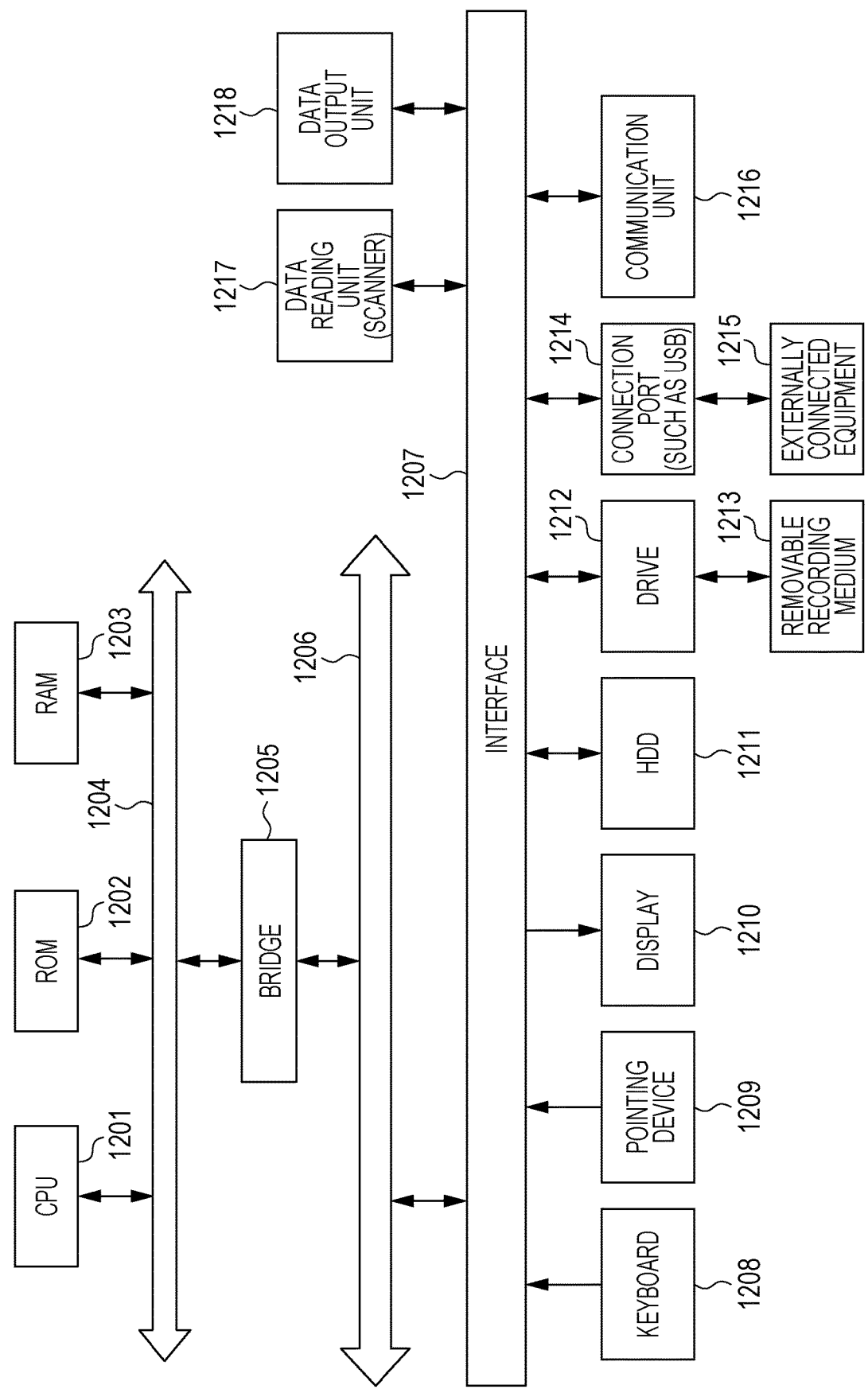

INFORMATION PROCESSING DEVICE FOR APPLYING CHANGES TO A TASK OF A PROCESS FLOW WHEN A DYNAMICALLY CHANGEABLE FLAG IS ATTACHED TO THE TASK

CROSS-REFERENCE TO RELATED APPLICATIONS

This application is based on and claims priority under 35 USC 119 from Japanese Patent Application No. 2016-159259 filed Aug. 15, 2016.

BACKGROUND

Technical Field

The present invention relates to an information processing device, an information processing method, and a non-transitory computer-readable medium.

SUMMARY

According to an aspect of the invention, there is provided an information processing device including a confirmation unit and an application unit. If a changeable flag is attached to a process flow, the confirmation unit confirms whether or not a change exists in a master of the process flow. If the confirmation unit confirms that a change exists in the master, the application unit applies the change to the process flow that is to be executed.

BRIEF DESCRIPTION OF THE DRAWINGS

An exemplary embodiment of the present invention will be described in detail based on the following figures, wherein:

FIG. 4 is an explanatory diagram illustrating an exemplary data structure of a job flow table;

FIG. 12 is a block diagram illustrating an exemplary hardware configuration of a computer that realizes an exemplary embodiment.

DETAILED DESCRIPTION

Figure 1:
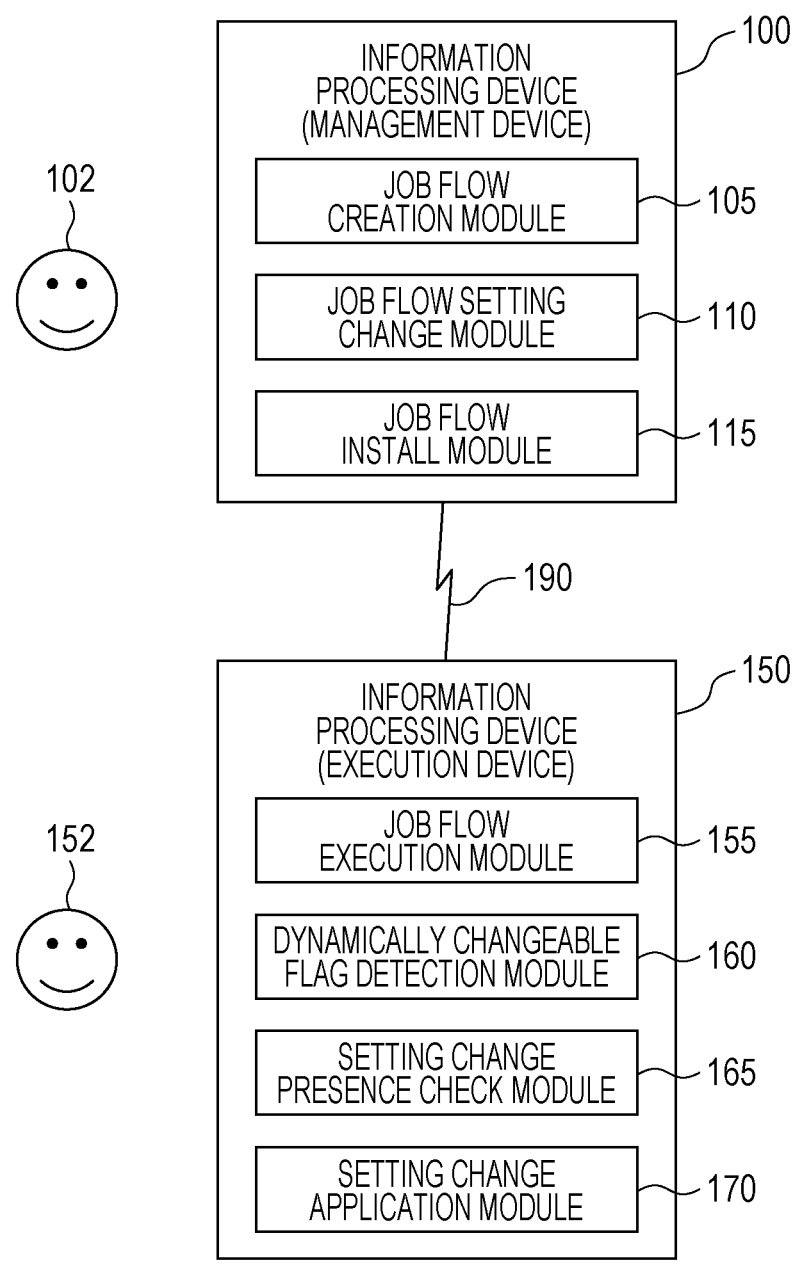
FIG. 1 is a schematic module configuration diagram for an exemplary configuration according to an exemplary embodiment.

Hereinafter, an exemplary embodiment related to realizing the present invention will be described by way of example on the basis of the drawings. FIG. 1 illustrates a schematic module configuration for an exemplary configuration according to the exemplary embodiment.

Note that the term module refers to components such as software (computer programs) and hardware which are typically capable of being logically separated. Consequently, the term module in the exemplary embodiment not only refers to modules in a computer program, but also to modules in a hardware configuration. Thus, the exemplary embodiment also serves as a description of a computer program (a program that causes a computer to execute respective operations, a program that causes a computer to function as respective units, or a program that causes a computer to realize respective functions), a system, and a method for inducing functionality as such modules. Note that although terms like "store" and "record" and their equivalents may be used in the description for the sake of convenience, these terms mean that a storage device is made to store information or that control is applied to cause a storage device to store information in the case where the exemplary embodiment is a computer program. Also, while modules may be made to correspond with function on a one-to-one basis, some implementations may be configured such that one program constitutes one module, such that one program constitutes multiple modules, or conversely, such that multiple programs constitute one module. Moreover, multiple modules may be executed by one computer, but one module may also be executed by multiple computers in a distributed or parallel computing environment. Note that a single module may also contain other modules. Also, the term "connection" may be used hereinafter to denote logical connections (such as the transfer of data and referential relationships between instructions and data) in addition to physical connections. The term "predetermined" refers to something being determined prior to the processing in question, and obviously denotes something that is determined before a process according to the exemplary embodiment starts, but may also denote something that is determined after a process according to the exemplary embodiment has started but before the processing in question, in accordance with conditions or states at that time, or in accordance with conditions or states up to that time. In the case of multiple "predetermined values", the predetermined values may be respectively different values, or two or more values (this obviously also includes the case of all values) which are the same. Additionally, statements to the effect of "B is conducted in the case of A" are used to denote that a determination is made regarding whether or not A holds true, and B is conducted in the case where it is determined that A holds true. However, this excludes cases where the determination of whether or not A holds true may be omitted.

Also, the terms "system" and "device" not only encompass configurations in which multiple computers, hardware, or devices are connected by a communication medium such as a network (including connections that support 1-to-1 communication), but also encompass configurations realized by a single computer, hardware, or device. The terms "device" and "system" are used interchangeably. Obviously, the term "system" does not include merely artificially arranged social constructs (social systems).

Also, every time a process is conducted by each module or every time multiple processes are conducted within a module, information to be processed is retrieved from a storage device, and the processing results are written back to the storage device after the processing. Consequently, description of the retrieval from a storage device before processing and the writing back to a storage device after processing may be reduced or omitted in some cases. Note that the storage device herein may include a hard disk, random access memory (RAM), an auxiliary or external storage medium, a storage device accessed via a communication link, and a register or the like inside a central processing unit (CPU).

In an information processing system made of the combination of an information processing device (management device) 100 and an information processing device (execution device) 150 according to the exemplary embodiment, if the master of a process flow in the information processing device (management device) 100 changes, the information processing device (execution device) 150 applies the changes to a process flow corresponding to the master, and executes the process flow in which the changes have been applied. As illustrated by the example in FIG. 1, the information processing device (management device) 100 and the information processing device (execution device) 150 are connected via a communication link 190.

The information processing device (execution device) 150 executes a process flow (hereinafter also called a job flow) by which a series of multiple tasks (processes) are conducted. The information processing device (execution device) 150 may be an image processing device, for example, and more specifically, may be a device such as a photocopier, a fax machine, a scanner, a printer, or a multi-function device (that is, an image processing device having two or more from among scanning, printing, copying, and faxing functions).

A task refers to a process that is executable by the individual functions in the information processing device (execution device) 150, or a process that is executable by an executed application. Input and output tasks included in the above image processing device may include, for example, scanning an original document, printing document data, transmitting information (such as electronic mail, fax, or file transmission), and saving information to a storage device (for example, saving to a hard disk internal or external to the information processing device (execution device) 150). Also, editing tasks may include, for example, joining together multiple sets of document data, and adding or removing pages inside document data.

In addition, a combination of a series of tasks created for the purpose of chaining multiple such tasks together to be processed sequentially is called a process flow. Various types of combinations are possible, including, for example, taking a result obtained by one task as input, and launching another task depending on the processed result.

In order for each information processing device (execution device) 150 to acquire a process flow, a master which acts as the source of the process flow inside the information processing device (management device) 100 is installed by each information processing device (execution device) 150.

For example, for a process flow that is used frequently, it may be difficult to apply changes made to the master of the process flow to the process flows inside all of the information processing devices (execution devices) 150.

For example, in the information processing device (management device) 100, a changeable flag may be set for the master of a process flow, to indicate whether or not the process flow may be changed during execution (that is, during the execution of the process flow in the information processing device (execution device) 150 in which the relevant master is installed). Subsequently, if the changeable flag is set, during execution of the process flow in the information processing device (execution device) 150 (at least before the changed part is executed), the presence of a change in the master in the information processing device (management device) 100 is checked, and if a change exists, the change is applied to the process flow in the information processing device (execution device) 150, and the changed process flow is executed.

The information processing device (management device) 100 includes a job flow creation module 105, a job flow setting change module 110, and a job flow install module 115. The information processing device (management device) 100 is a device used by a job flow administrator 102 to manage the master of a process flow. Specifically, the information processing device (management device) 100 is used to create a process flow, change the settings for a process flow, and install a process flow in the information processing device (execution device) 150 where the process flow is to be executed. Note that a master herein refers to information that acts as the source of a process flow executed by each information processing device (execution device) 150, and may also be called a definition, basis, form, frame, pattern, template, model, or the like. Herein, by installing a process flow master inside the information processing device (management device) 100 to each information processing device (execution device) 150, each information processing device (execution device) 150 becomes able to execute the process flow. Herein, installing may refer to generating a copy of the master, and may also include generating a process flow by altering the master to match each information processing device (execution device) 150.

Note that the job flow administrator 102 is a user who uses a device for managing the master of a process flow (the information processing device (management device) 100) to give instructions related to the maintenance of the master of the process flow.

The job flow creation module 105 creates a master of a process flow according to operations performed by the job flow administrator 102. The creation of a master includes setting a dynamically changeable flag 325 (a type of changeable flag). Note that the changeable flag is used to check for the presence of a setting change in the master before the relevant setting is used, and if there is a change, the changeable flag indicates that the change may be applied. Also, the dynamically changeable flag 325 adopts a case in which the process flow has already been executed as "before the relevant setting is used", and is used to check for the presence of a setting change in the master after the process flow is executed. If there is a change, the dynamically changeable flag 325 indicates that the change may be applied. Note that "before the relevant setting is used" may also be before the process flow is executed. For example, the changeable flag may also be treated as a flag used to check for the presence of a setting change in the master periodically on a predetermined interval, and if there is change, the changeable flag indicates that the change may be applied.

Note that the decision of where to set the changeable flag in the process flow may be left to the job flow administrator 102. In other words, such a decision is part of the job flow design.

In addition, that which is referred to as a changeable "setting" is not limited only to parameters, such as simple numerical values. For example, if the job flow administrator 102 has designed a process flow so that an arbitrary task may be added at a certain point in the process flow, and a desired execution result is obtained even if the additional task is executed, such an additional task is a changeable setting. Consequently, the "changeable flag" may also indicate a change like the above.

The job flow setting change module 110 changes the setting of part of a process flow master, according to operations performed by the job flow administrator 102.

The job flow install module 115 installs a process flow to a device that is to execute the process flow (the information processing device (execution device) 150). The triggering of this process may be in response to an operation performed by the job flow administrator 102, or in response to a request from the information processing device (execution device) 150.

The information processing device (execution device) 150 includes a job flow execution module 155, a dynamically changeable flag detection module 160, a setting change presence check module 165, and a setting change application module 170. The information processing device (execution device) 150 is a device used by a job flow user 152 to execute a process flow.

The job flow user 152 is a user who gives an instruction causing the execution of a process flow installed in a device that executes a job flow (the information processing device (execution device) 150).

The job flow execution module 155 executes an installed process flow. Herein, an installed process flow is a process flow in an executable state on the information processing device (execution device) 150 (for example, a copy of a master).

Also, the job flow execution module 155 executes a process flow to which changes have been applied by the setting change application module 170.

Additionally, the job flow execution module 155 may also be configured to execute the unchanged process flow if a check by the setting change presence check module 165 is unavailable, or if the application of changes by the setting change application module 170 is unavailable. The above case generally refers to a situation in which reinstalling the process flow is difficult because the process flow is used frequently. The above case is also applicable when the information processing device (management device) 100 is down (such as when powered off or when an error has occurred, for example) or when there is a break in communication, for example. Having the process flow stop due to an error is undesirable. Consequently, if a process flow is executable, the execution of the process flow is continued, even if the settings are out-of-date (that is, even if changes have not been applied).

The dynamically changeable flag detection module 160 detects the presence of the changeable flag in an installed process flow.

If the changeable flag is attached to a process flow, the setting change presence check module 165 checks whether or not there is a change in the master of that process flow.

If the setting change presence check module 165 confirms that there is a change in the master, the setting change application module 170 applies the change (the change in the master of the process flow) to the process flow that is to be executed.

In addition, the setting change presence check module 165 may also be configured to perform a check when executing a process flow to be executed. In other words, the setting change presence check module 165 may also perform a check immediately after the execution of the process flow starts (before starting the first task in the process flow).

In this case, the setting change application module 170 may be configured to apply changes when executing the process flow to be executed, or when executing the task to which the changeable flag is attached. Herein, "when executing the task to which the changeable flag is attached" indicates a time immediately after the execution of the task starts (before the substantial process for the task is conducted), or a time before the task is started, and the process of applying changes may be preprocessing for the task.

In addition, the setting change presence check module 165 may also be configured to perform a check when executing a task to which the changeable flag is attached inside a process flow to be executed.

In this case, the setting change application module 170 may be configured to apply changes when executing the task to which the changeable flag is attached.

Figure 2:
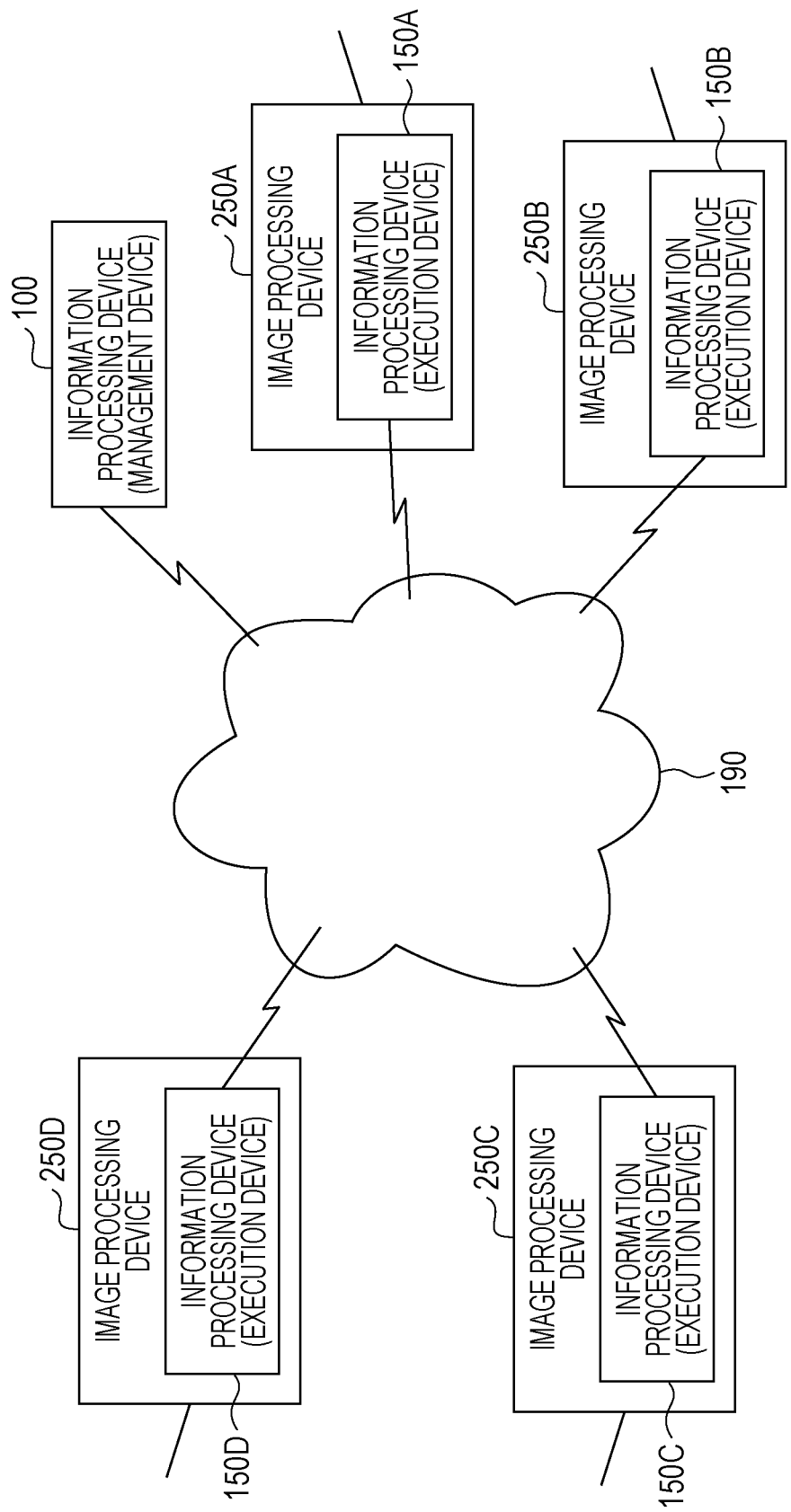
FIG. 2 is an explanatory diagram illustrating an exemplary system configuration utilizing an exemplary embodiment.

FIG. 2 is an explanatory diagram illustrating an exemplary system configuration utilizing an exemplary embodiment.

An image processing device 250 includes the information processing device (execution device) 150. In other words, the functions of the information processing device (execution device) 150 are incorporated into the image processing device 250. The information processing device (management device) 100, the information processing device (execution device) 150A of an image processing device 250A, the information processing device (execution device) 150B of an image processing device 250B, the information processing device (execution device) 150C of an image processing device 250C and the information processing device (execution device) 150D of an image processing device 250D are interconnected via the communication link 190. The communication link 190 may be wireless, wired, or a combination of the two, and may use a network such as the Internet or an intranet as a communication infrastructure, for example. Also, the functions provided by the information processing device (management device) 100 may also be realized as a cloud service.

Figure 3A:
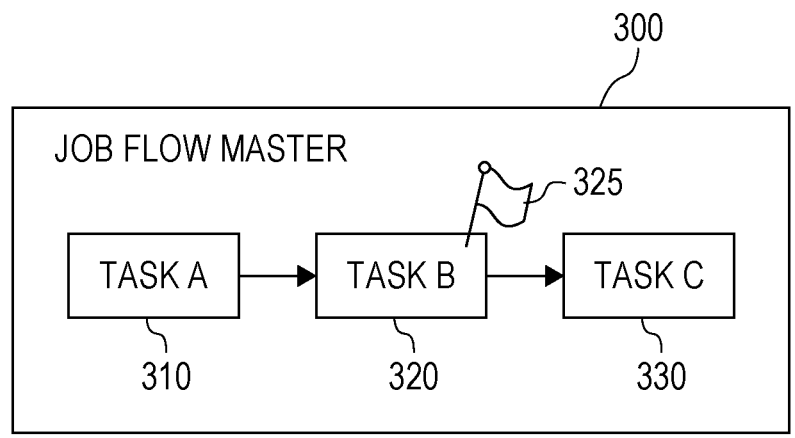
FIGS. 3A and 3B are explanatory diagrams illustrating an example of a process flow to be processed by an exemplary embodiment.
Figure 3B:
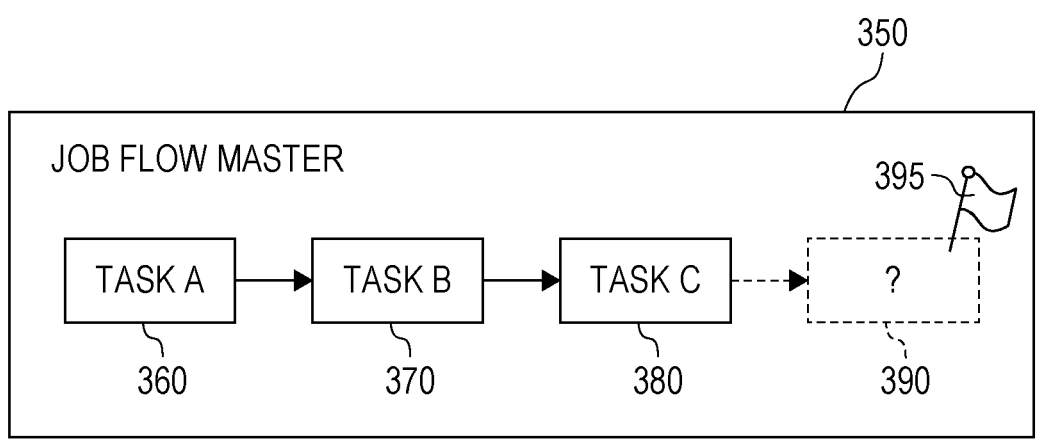

FIGS. 3A and 3B are explanatory diagrams illustrating an example of a process flow to be processed by an exemplary embodiment.

The master 300 of a job flow illustrated by the example in FIG. 3A indicates that a task A 310, a task B 320, and a task C 330 are to be processed sequentially. Additionally, the dynamically changeable flag 325 is attached to the task B 320. In other words, the master 300 indicates the possibility of a change in a setting inside the task B 320 to which the dynamically changeable flag 325 is attached. For example, the task A 310 may be an "image scanning" task, the task B 320 may be a "character recognition process" task, and the task C 330 may be a "file registration of character recognition result" task, or the like. Additionally, if a change of parameters in the character recognition process is anticipated (specifically, if a future change to a recognition dictionary with good recognition accuracy is anticipated), the dynamically changeable flag 325 is attached to the task B 320.

The master 350 of a job flow illustrated by the example in FIG. 3B indicates that a task A 360, a task B 370, and a task C 380 are to be processed sequentially. Also, the master 350 indicates that the future addition of an additional task 390 after the task C 380 is anticipated. In other words, a dynamically changeable flag 395 is attached to the additional task 390. Herein, the dynamically changeable flag 395 indicates the dynamic addition of an additional task. In other words, in the case of realizing an operation of dynamically adding an additional task at a certain point inside the master 350 of the job flow, it is sufficient to create the additional task 390 as a dummy task (that is, a task in which nothing is performed), and attach the dynamically changeable flag 395 to the additional task 390.

A process flow is defined by a job flow table 400, for example. FIG. 4 is an explanatory diagram illustrating an exemplary data structure of the job flow table 400. The job flow table 400 includes a job flow ID field 410, a master flag field 415, a number of tasks field 420, a dynamically changeable flag position field 425, and a task field 430. The task field 430 includes a task ID field 432, a previous task ID field 434, and a next task ID field 436. In the exemplary embodiment, the job flow ID field 410 stores information (a job flow identification (ID)) for uniquely identifying a job flow. The master flag field 415 stores a flag indicating whether or not the job flow is a master (the job flow is a master if inside the information processing device (management device) 100, whereas the job flow is not a master (that is, an instance) if inside the information processing device (execution device) 150). The number of tasks field 420 stores the number of tasks constituting the job flow. After the dynamically changeable flag position field 425, there follows a number of task fields 430 equal to the number of tasks stored in the number of tasks field 420. The dynamically changeable flag position field 425 stores the task ID of the task to which the dynamically changeable flag is attached. Multiple task IDs may also be stored. The task field 430 stores a task. In the exemplary embodiment, the task ID field 432 stores information (a task ID) for uniquely identifying a task. The previous task ID field 434 stores the task ID of the task that comes before the current task. The next task ID field 436 stores the task ID of the task that comes after the current task. Note that either one of the previous task ID field 434 and the next task ID field 436 may also not be included. Typically, only the next task ID 436 may be provided. Also, multiple tasks IDs may be stored in the previous task ID field 434 and the next task ID field 436. For example, actions such as process branching or process merging may be realized, and job flows other than a simply linear job flow may also be realized.

Figure 5:
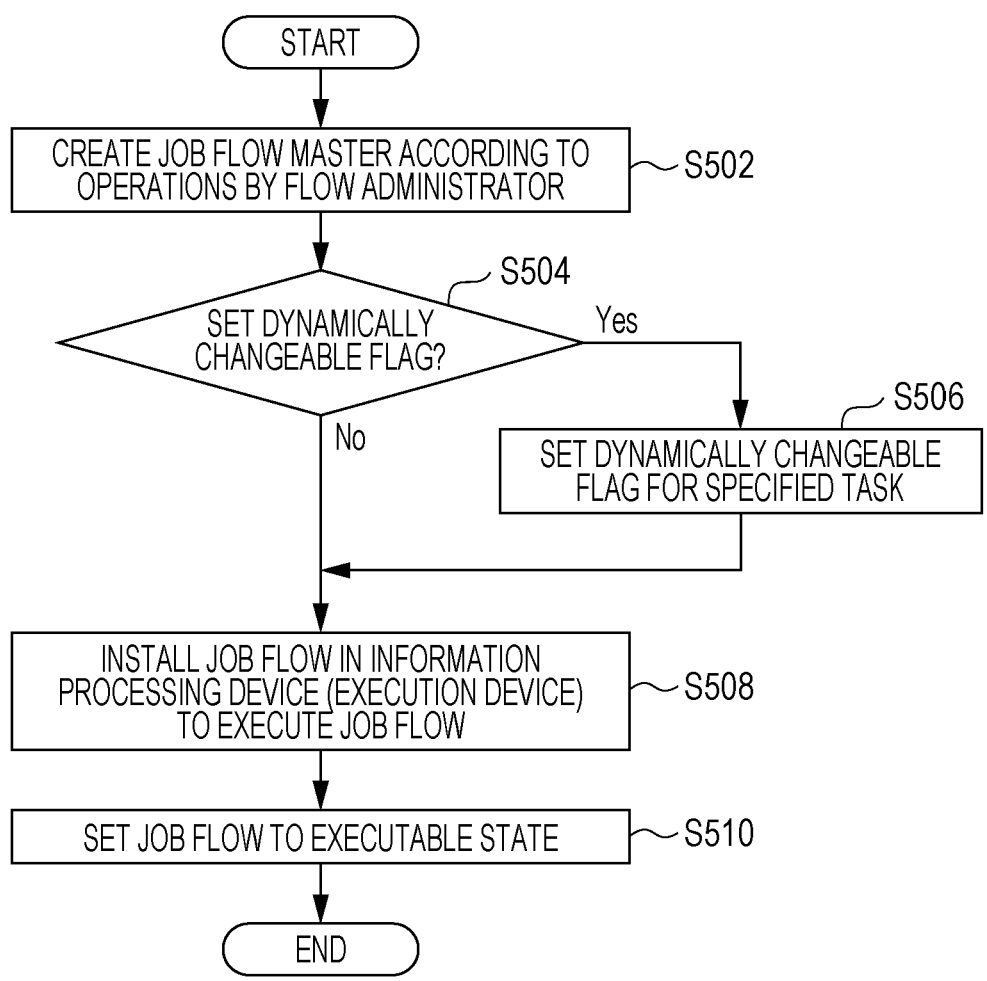
FIG. 5 is a flowchart illustrating an example process according to an exemplary embodiment.

FIG. 5 is a flowchart illustrating an example process performed by the exemplary embodiment (in particular, the information processing device (management device) 100).

In step S502, the job flow creation module 105 creates a master of a job flow, according to operations performed by the job flow administrator 102.

In step S504, it is determined whether or not to set the dynamically changeable flag, and in the case of setting the dynamically changeable flag, the flow proceeds to step S506. Otherwise, the flow proceeds to step S508.

In step S506, the dynamically changeable flag is set for the specified task.

In step S508, the job flow install module 115 installs the job flow in the information processing device (execution device) 150 that is to execute the job flow.

In step S510, the information processing device (execution device) 150 sets the job flow to an executable state.

Figure 6:
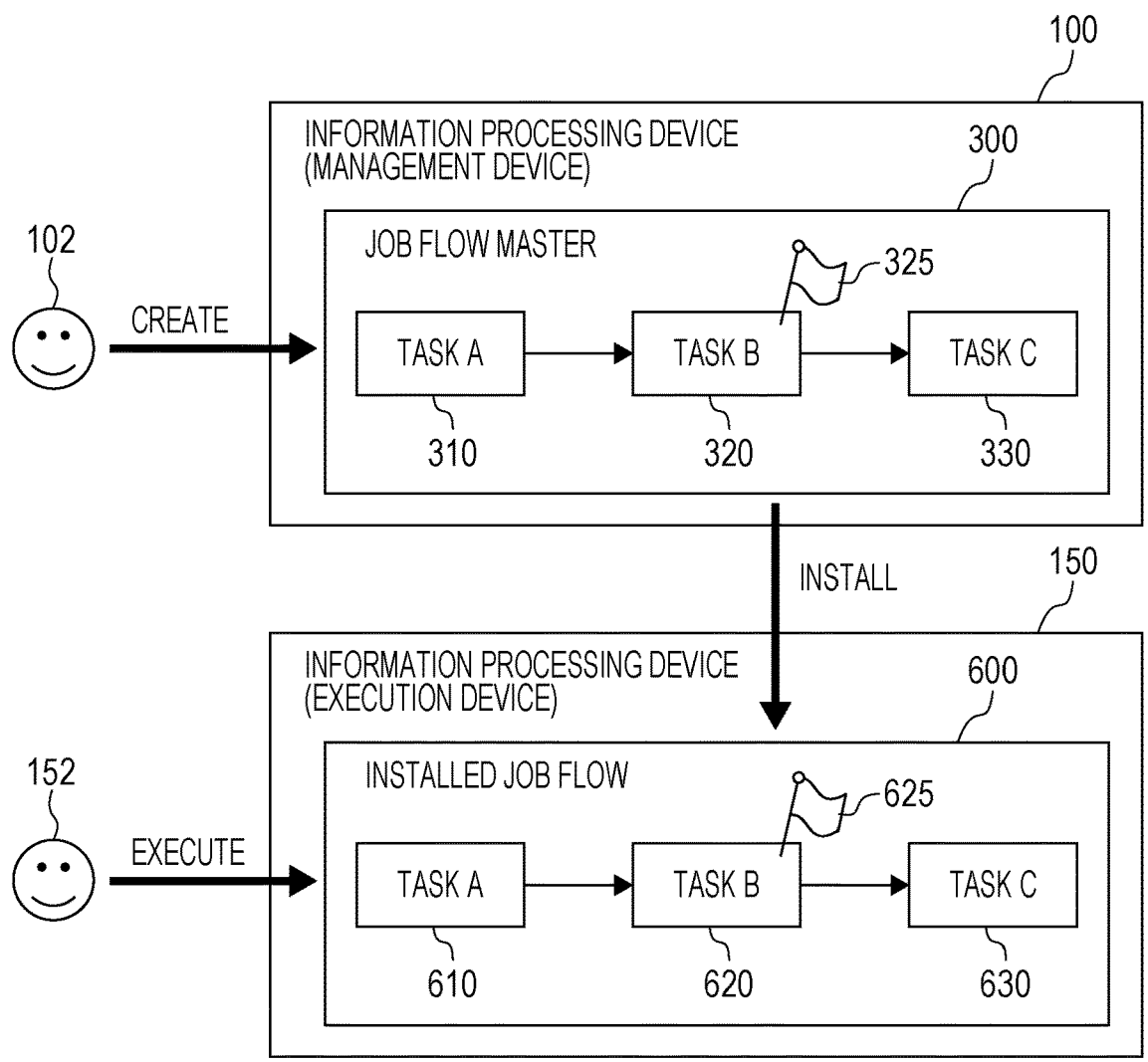
FIG. 6 is an explanatory diagram illustrating an example process according to an exemplary embodiment.

FIG. 6 is an explanatory diagram illustrating an example process according to the exemplary embodiment.

The information processing device (management device) 100 creates the master 300 of a job flow, according to operations performed by the job flow administrator 102. Subsequently, the created master 300 of the job flow is installed in the information processing device (execution device) 150. Obviously, the installed job flow 600 conducts a process equal to the master 300 of the job flow. The installed job flow 600 includes a task A 610, a task B 620, and a task C 630. Obviously, a dynamically changeable flag 625 is attached to the task B 620, in correspondence with the master 300 of the job flow.

Additionally, in the information processing device (execution device) 150, the installed job flow 600 is set to an executable state, according to operations performed by the job flow user 152.

Figure 7:
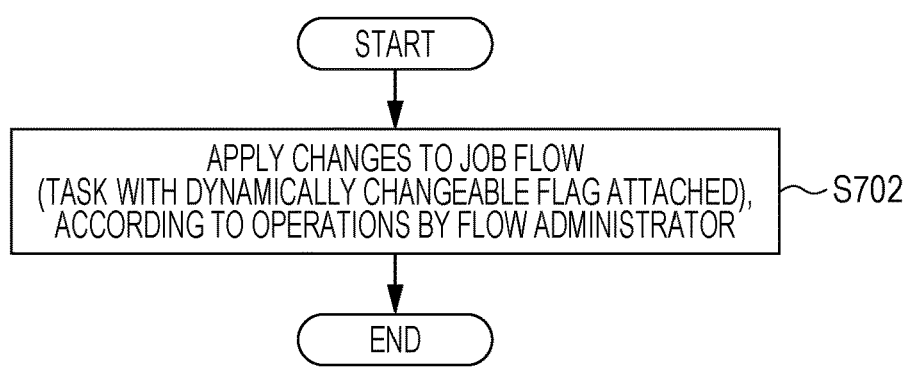
FIG. 7 is a flowchart illustrating an example process according to an exemplary embodiment.

FIG. 7 is a flowchart illustrating an example process performed by the exemplary embodiment (information processing device (management device) 100).

In step S702, the job flow setting change module 110 adds a change to master job flow (specifically, the task to which the dynamically changeable flag is attached), according to operations performed by the job flow administrator 102. In the example of FIG. 6, a setting change is made to the task B 320 to which the dynamically changeable flag 325 is attached. In the example discussed earlier, the recognition dictionary used by the task B 320 is changed to one with good recognition accuracy. At this point, only the master 300 of the job flow inside the information processing device (management device) 100 is changed, whereas the installed job flow 600 in the information processing device (execution device) 150 is not changed.

Figure 8:
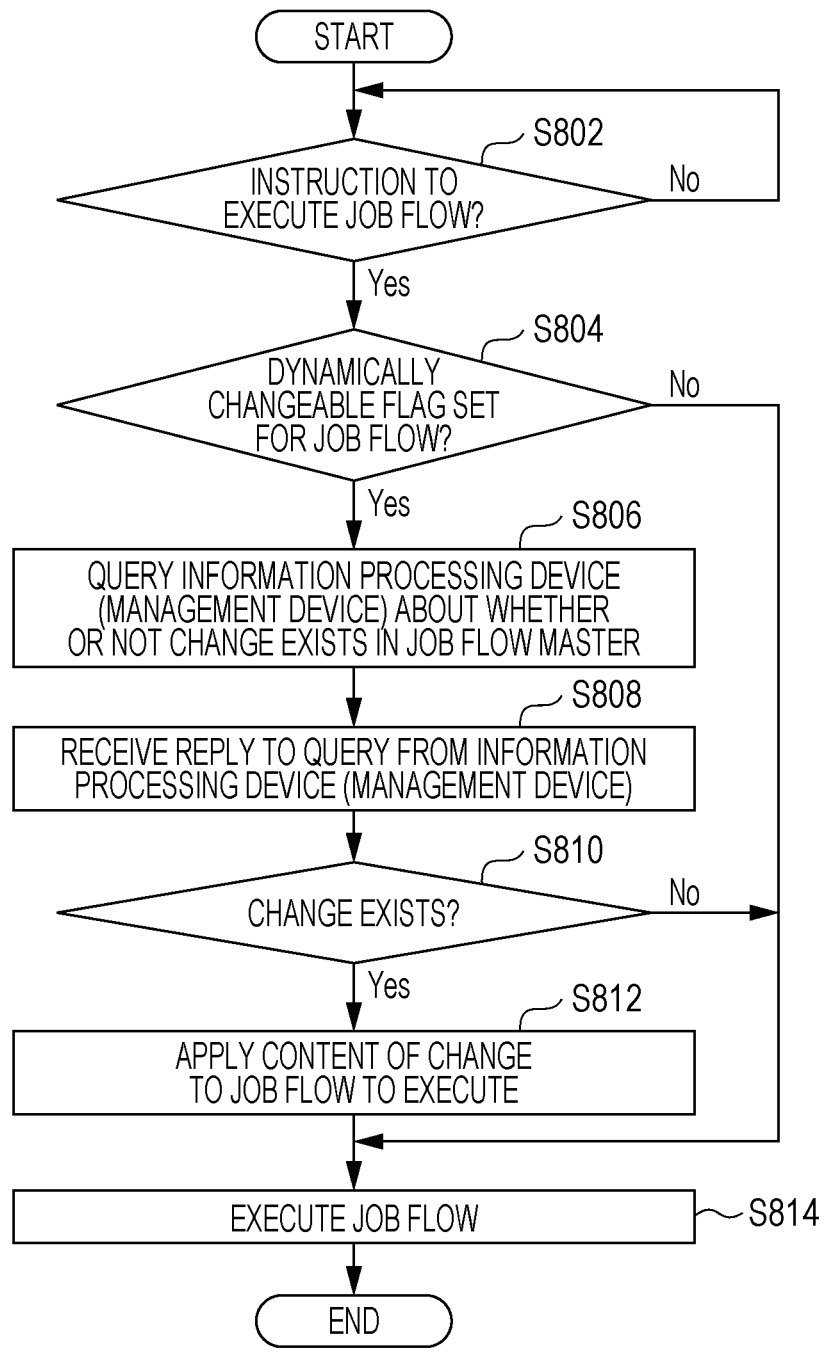
FIG. 8 is a flowchart illustrating an example process according to an exemplary embodiment.

FIG. 8 is a flowchart illustrating an example process performed by the exemplary embodiment (information processing device (execution device) 150). The process illustrated by the example of FIG. 8 is conducted after conducting the process according to the flowchart illustrated by the example of FIG. 7.

In step S802, the job flow execution module 155 determines whether or not the job flow user 152 has given an instruction to execute the job flow, and if there is such an execution instruction, the flow proceeds to step S804. Otherwise, the flow stands by until the execution instruction is given.

In step S804, the dynamically changeable flag detection module 160 determines whether or not the dynamically changeable flag is set in the job flow, and if set, the flow proceeds to step S806. Otherwise, the flow proceeds to step S814.

In step S806, the setting change presence check module 165 queries the information processing device (management device) 100 whether or not there is a change in the master of the job flow.

In step S808, the setting change presence check module 165 receives a reply to the query from the information processing device (management device) 100. This reception (in other words, the transmission by the information processing device (management device) 100) may also include the content of the change in addition to the answer to the query.

In step S810, the setting change presence check module 165 determines whether or not there is a change in the master of the job flow, and if there is a change, the flow proceeds to step S812. Otherwise, the flow proceeds to step S814.

In step S812, the setting change application module 170 applies the content of the change in the master of the job flow to the job flow that is to be executed.

In step S814, the job flow execution module 155 executes the job flow.

Figure 9:
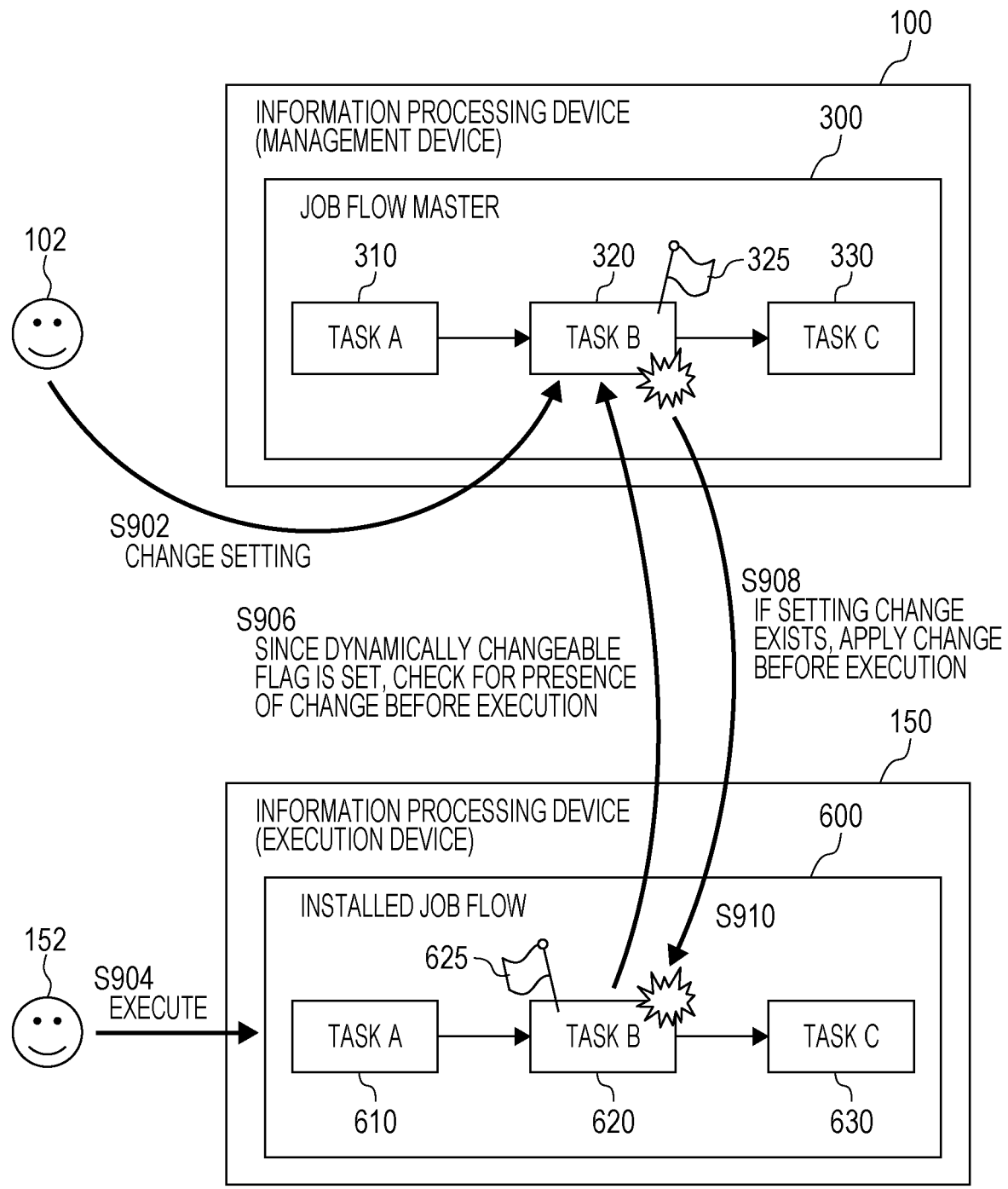
FIG. 9 is an explanatory diagram illustrating an example process according to an exemplary embodiment.

FIG. 9 is an explanatory diagram illustrating an example of a process according to the exemplary embodiment.

In step S902, the job flow administrator 102 changes a setting. In other words, a setting is changed in the task B 320 to which the dynamically changeable flag 325 is attached in the master 300 of the job flow inside the information processing device (management device) 100.

In step S904, the job flow user 152 causes the installed job flow 600 to be executed. In other words, the installed job flow 600 inside the information processing device (execution device) 150 is executed.

In step S906, since the dynamically changeable flag 625 exists in the installed job flow 600, the presence of a change in the master 300 is checked before executing the installed job flow 600.

In step S908, if there is a setting change in the master 300 of the job flow, the change is applied before executing the installed job flow 600.

In step S910, the setting change in the master 300 of the job flow is applied to the installed job flow 600. In other words, the setting change in the task B 320 is also applied to the task B 620.

Figure 10:
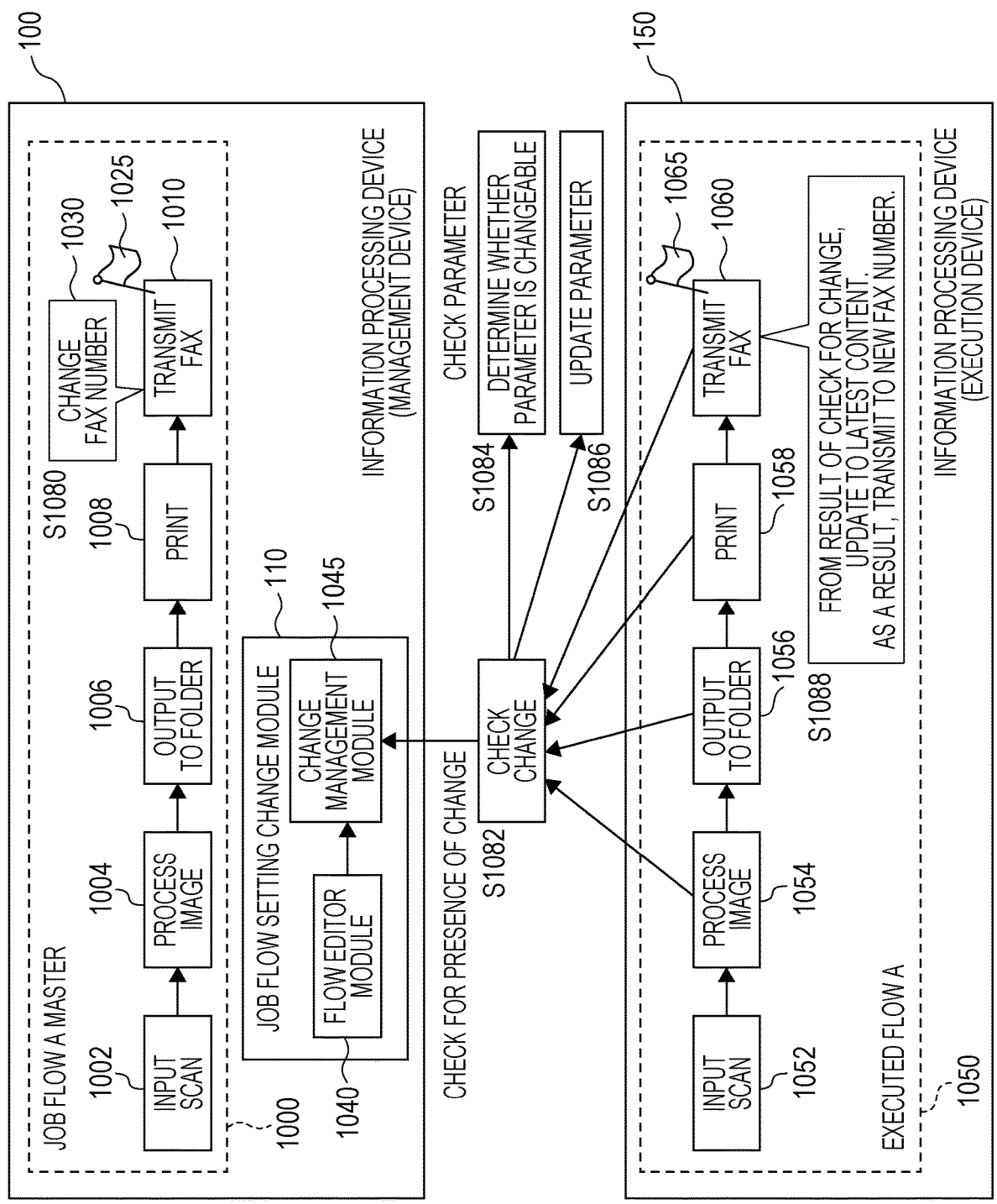
FIG. 10 is an explanatory diagram illustrating an example process according to an exemplary embodiment.
Figure 10:
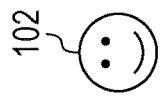
Figure 10:
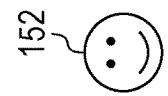

FIG. 10 is an explanatory diagram illustrating an example process according to the exemplary embodiment.

In the information processing device (management device) 100, a master 1000 of a job flow A is stored. The master 1000 of the job flow A indicates that the tasks of Input Scan 1002, Process Image 1004, Output to Folder 1006, Print 1008, and Transmit Fax 1010 are to be processed sequentially. Additionally, a dynamically changeable flag 1025 is attached to Transmit Fax 1010. In other words, in Transmit Fax 1010, a task of Change Fax Number 1030 is anticipated. In the information processing device (execution device) 150, the master 1000 of the job flow A is installed, and an executed flow A is stored. The executed flow A indicates that the tasks of Input Scan 1052, Process Image 1054, Output to Folder 1056, Print 1058, and Transmit Fax 1060 are to be processed sequentially. Additionally, a dynamically changeable flag 1065 is attached to Transmit Fax 1060.

The job flow setting change module 110 includes a flow editor module 1040 and a change management module 1045.

In step S1080, the flow editor module 1040 conducts Change Fax Number 1030 on Transmit Fax 1010, according to a change instruction given by the job flow administrator 102. The change management module 1045 manages the change performed on Transmit Fax 1010 to which the dynamically changeable flag 1025 is attached.

After that, in the information processing device (execution device) 150, execution of the executed flow A 1050 is started, according to an execution instruction given by the job flow user 152.

In step S1082, since the dynamically changeable flag 1065 is attached to Transmit Fax 1060, the presence of a change is checked in the change management module 1045.

In step S1084, it is determined whether or not a parameter (the fax number) is changeable in the executed flow A 1050. Note that for this determination, it is sufficient for the parameters of each task in the executed flow A 1050 to have a flag indicating whether or not dynamic change is allowed (a flag different from the dynamically changeable flag 1065), and to check such a flag.

In step S1086, the parameter (fax number) in Transmit Fax 1060 is updated.

In step S1088, as a result of the update check in step S1082, Transmit Fax 1060 is updated to the most recent content. Subsequently, as a result, by the execution of the executed flow A 1050, a fax is transmitted to the new fax number in the Transmit Fax 1060 task.

Figure 11:
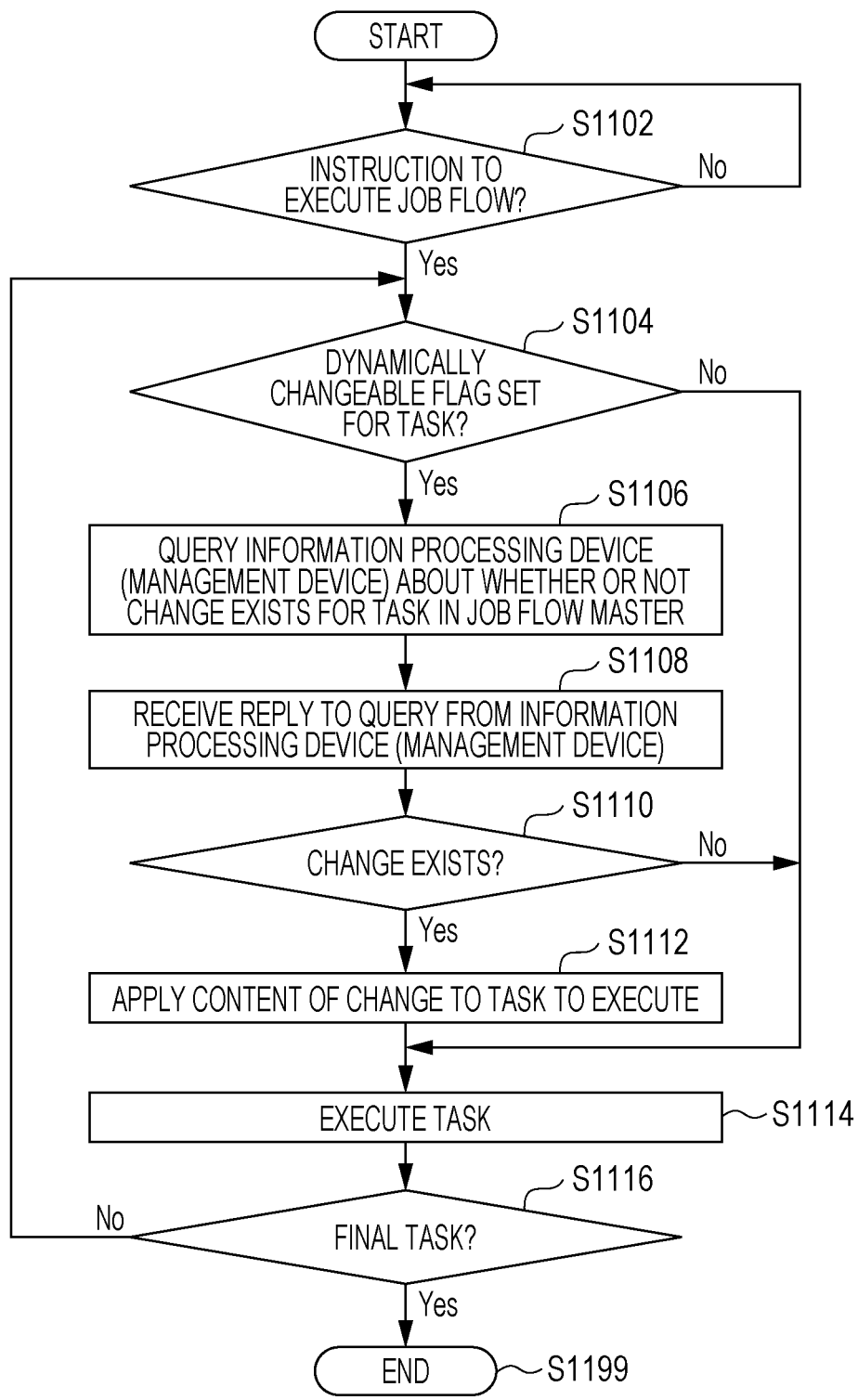
FIG. 11 is a flowchart illustrating an example process according to an exemplary embodiment.

FIG. 11 is a flowchart illustrating an example process performed by the exemplary embodiment (information processing device (execution device) 150). The flowchart illustrated by the example of FIG. 11 conducts a process of determining whether or not a change exists immediately before executing each task. In other words, the check for a change is performed immediately before a dynamically changeable setting is used. In the example process illustrated by the example in FIG. 8, immediately before executing the (overall) job flow, there is performed a determination of whether or not the dynamically changeable flag is set, and whether or not a change actually has been made. However, in the example process illustrated by the example in FIG. 11, this determination is performed immediately before executing each task inside the job flow. In cases in which the processing of each task in the job flow is time-consuming, if the checks for changes in settings are performed all at once before executing the first task of the job flow, the time lag until the changes are applied may pose a difficulty. By performing the check for a change immediately before the relevant setting is used, the time lag may be reduced.

In step S1102, the job flow execution module 155 determines whether or not an instruction to execute the job flow has been given, and if there is such an execution instruction, the flow proceeds to step S1104. Otherwise, the flow stands by until the execution instruction is given.

In step S1104, the dynamically changeable flag detection module 160 determines whether or not the dynamically changeable flag is set in the task about to be executed in the job flow, and if set, the flow proceeds to step S1106. Otherwise, the flow proceeds to step S1114.

In step S1106, the setting change presence check module 165 queries the information processing device (management device) 100 whether or not there is a change in the relevant task in the master of the job flow.

In step S1108, the setting change presence check module 165 receives a reply to the query from the information processing device (management device) 100.

In step S1110, the setting change presence check module 165 determines whether or not there is a change, and if there is a change, the flow proceeds to step S1112. Otherwise, the flow proceeds to step S1114.

In step S1112, the setting change application module 170 applies the content of the change to the task that is to be executed.

In step S1114, the job flow execution module 155 executes the task.

In step S1116, it is determined whether or not the task is the final task in the job flow, and if the task is the final task, the process ends (step S1199). Otherwise, the flow returns to step S1104.

Note that the determination of whether or not the dynamically changeable flag is set may also be performed when starting the (overall) job flow, and the application of a change may be performed when starting the task for which the dynamically changeable flag is set.

An exemplary hardware configuration of the information processing device (management device) 100, the information processing device (execution device) 150, and the image processing device 250 according to the exemplary embodiment will be described with reference to FIG. 12. The configuration illustrated in FIG. 12 may be realized by a personal computer (PC), for example, and illustrates an exemplary hardware configuration equipped with a data reading unit 1217 such as a scanner, and a data output unit 1218 such as a printer.

The central processing unit (CPU) 1201 is a controller that executes processing according to a computer program that states execution sequences for the various modules described in the exemplary embodiment discussed in the foregoing, or in other words, for respective modules such as the job flow creation module 105, the job flow setting change module 110, the job flow install module 115, the job flow execution module 155, the dynamically changeable flag detection module 160, the setting change presence check module 165, and the setting change application module 170.

The read-only memory (ROM) 1202 stores information such as programs and computational parameters used by the CPU 1201. The random access memory (RAM) 1203 stores information such as programs used during execution by the CPU 1201, and parameters that change as appropriate during such execution. These memory units are connected to each other by a host bus 1204 realized by a CPU bus, for example.

The host bus 1204 is connected to an external bus 1206 such as a Peripheral Component Interconnect/Interface (PCI) bus via the bridge 1205.

The keyboard 1208 and the mouse or other pointing device 1209 are devices operated by a user. The display 1210 may be a liquid crystal display (LCD) or cathode ray tube (CRT) device, and displays various information as text and image information. Additionally, a device such as a touchscreen equipped with the functions of both the pointing device 1209 and the display 1210 is also acceptable.

The hard disk drive (HDD) 1211 houses and drives a hard disk (which may also be flash memory or the like), causing programs executed by the CPU 1201 and information to be recorded thereto or retrieved therefrom. The hard disk stores information such as a process flow, a changeable flag, the processing target of a process flow (such as an image), and a processed result. Additionally, information such as various other data and various computer programs are stored therein.

The drive 1212 reads out data or programs recorded onto a removable recording medium 1213 such as an inserted magnetic disk, optical disc, magneto-optical disc, or semiconductor memory, and supplies the data or programs to the RAM 1203 connected via the interface 1207, the external bus 1206, the bridge 1205, and the host bus 1204. Note that the removable recording medium 1213 is also usable as a data recording area.

The connection port 1214 is a port that connects to an externally connected device 1215, and has a USB, IEEE 1394, or similar receptacle. The connection port 1214 is connected to the CPU 1201 via the interface 1207, the external bus 1206, the bridge 1205, and the host bus 1204. The communication unit 1216 is connected to a communication link and executes data communication processing with external equipment. The data reading unit 1217 may be a scanner, for example, and executes document scanning processing. The data output unit 1218 may be a printer, for example, and executes document data output processing.

Note that the hardware configuration of the information processing device (management device) 100, the information processing device (execution device) 150, and the image processing device 250 illustrated in FIG. 12 illustrates a single exemplary configuration, and that the exemplary embodiment is not limited to the configuration illustrated in FIG. 12 insofar as the configuration still enables execution of the modules described in the exemplary embodiment. For example, some modules may also be realized with special-purpose hardware (such as an application-specific integrated circuit (ASIC), for example), and some modules may be configured to reside within an external system and be connected via a communication link. Furthermore, it may also be configured such that multiple instances of the system illustrated in FIG. 12 are connected to each other by a communication link and operate in conjunction with each other. Additionally, besides a personal computer in particular, an exemplary embodiment may also be incorporated into a device such as a mobile information/communication device (including devices such as a mobile phone, a smartphone, mobile equipment, and a wearable computer), information appliance, robot, photocopier, fax machine, scanner, printer, or multi-function device.

Note that the described program may be provided stored in a recording medium, but the program may also be provided via a communication medium. In this case, a computer-readable recording medium storing a program, for example, may also be taken to be an exemplary embodiment of the present invention with respect to the described program.

A "computer-readable recording medium storing a program" refers to a computer-readable recording medium upon which a program is recorded, and which is used in order to install, execute, and distribute the program, for example.

The recording medium may be a Digital Versatile Disc (DVD), encompassing formats such as DVD-R, DVD-RW, and DVD-RAM defined by the DVD Forum and formats such as DVD+R and DVD+RW defined by DVD+RW Alliance, a compact disc (CD), encompassing formats such as read-only memory (CD-ROM), CD Recordable (CD-R), and CD Rewritable (CD-RW), a Blu-ray Disc (registered trademark), a magneto-optical (MO) disc, a flexible disk (FD), magnetic tape, a hard disk, read-only memory (ROM), electrically erasable and programmable read-only memory (EEPROM (registered trademark)), flash memory, random access memory (RAM), or a Secure Digital (SD) memory card, for example.

In addition, all or part of the above program may also be recorded to the recording medium and saved or distributed, for example. Also, all or part of the above program may be communicated by being transmitted using a transmission medium such as a wired or wireless communication network used in a local area network (LAN), a metropolitan area network (MAN), a wide area network (WAN), the Internet, an intranet, an extranet, or some combination thereof, or alternatively, by being modulated onto a carrier wave and propagated.

Furthermore, the above program may be part or all of another program, or be recorded to a recording medium together with other separate programs. The above program may also be recorded in a split manner across multiple recording media. The above program may also be recorded in a compressed, encrypted, or any other recoverable form.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device connected to a management device that stores a master process flow comprising a plurality of tasks, sets a dynamically changeable flag on at least one task of the plurality of tasks, and installs a process corresponding to the master process flow on the information processing device for execution, the information processing device, comprising:

a memory storing instructions for executing the installed process flow comprising the plurality of tasks including a first task and a second task subsequent to the first task; and a processor programmed to execute the instructions to:
start executing the installed process flow including the first task that does not have the dynamically changeable flag attached;
after executing the first task:
determine whether the dynamically changeable flag is attached to the second task when execution of the second task is started;
in response to determination that the dynamically changeable flag is attached to the second task:
communicate with the management device to confirm whether or not a change exists in a corresponding second task of the master process flow being managed by the management device;
upon confirming by the management device that the change exists in the corresponding second task of the master process flow, determine whether a parameter of the second task in the information processing device is dynamically changeable;
apply and execute the change to the second task in the information processing device by updating the parameter of the second task when the parameter of the second task is determined to be dynamically changeable; and
upon determining that the change is not confirmed by the management device or upon determining that the parameter of the second task is not dynamically changeable, execute the process flow without applying the change to the second task; and
in response to determination that the dynamically changeable flag is not attached to the second task, execute the second task without communicating with the management device to confirm whether the change exists in the master process flow.

2. The information processing device according to claim 1, wherein:
the communication with the management device occurs when execution of the second task is started.

3. The information processing device according to claim 2, wherein:
the change is applied to the second task when execution of the second task is started.

4. The information processing device according to claim 1, wherein:
upon determining that the change is not confirmed by the management device or upon determining that the change is unable to be applied in the information processing device, the information processing device executes the installed process flow without applying the change to the second task.

5. The information processing device according to claim 1, wherein
the parameter of the second task indicates a destination number for a facsimile function.

6. An information processing method performed by an information processing device connected to a management device that stores a master process flow comprising a plurality of tasks, sets a dynamically changeable flag on at least one task of the plurality of tasks, and installs a process corresponding to the master process flow on the information processing device for execution, the information processing method comprising:
storing instructions for executing the installed process flow comprising the plurality of tasks including a first task and a second task subsequent to the first task;
starting executing the installed process flow including the first task that does not have the dynamically changeable flag attached;
after executing the first task:
determining whether the dynamically changeable flag is attached to the second task when execution of the second task is started;
in response to determination that the dynamically changeable flag is attached to the second task:
communicating with the management device to confirm whether or not a change exists in a corresponding second task of the master process flow being managed by the management device;
upon confirming by the management device that the change exists in the corresponding second task of the master process flow, determining whether a parameter of the second task in the information processing device is dynamically changeable;
applying and executing the change to the second task in the information processing device by updating the parameter of the second task when the parameter of the second task is determined to be dynamically changeable; and
upon determining that the change is not confirmed by the management device or upon determining that the parameter of the second task is not dynamically changeable, executing the process flow without applying the change to the second task; and
in response to determination that the dynamically changeable flag is not attached to the second task, executing the second task without communicating with the management device to confirm whether the change exists in the master process flow.

7. The information processing method according to claim 6, wherein
the communicating with the management device occurs when execution of the second task is started.

8. The information processing method according to claim 7, wherein
the change is applied to the second task when execution of the second task is started.

9. The information processing method according to claim 6, wherein
upon determining that the change is not confirmed by the management device or upon determining that the change is unable to be applied in the information processing device, the information processing device executes the installed process flow without applying the change to the second task.

10. The information processing method according to claim 6, wherein
the parameter of the second task indicates a destination number for a facsimile function.

11. A non-transitory computer-readable medium storing a program causing a computer of an information processing device to execute a process for processing information, the information processing device being connected to a management device that stores a master process flow comprising a plurality of tasks, sets a dynamically changeable flag on at least one task of the plurality of tasks, and installs a process corresponding to the master process flow on the information processing device for execution, the process for processing information comprising:
  storing instructions for executing the installed process flow comprising the plurality of tasks including a first task and a second task subsequent to the first task;
  starting executing the installed process flow including the first task that does not have the dynamically changeable flag attached;
  after executing the first task:
    determining whether the dynamically changeable flag is attached to the second task when execution of the second task is started;
    in response to determination that the dynamically changeable flag is attached to the second task:
      communicating with the management device to confirm whether or not a change exists in a corresponding second task of the process master flow being managed by the management device; and
      upon confirming by the management device that the change exists in the corresponding second task of the master process flow, determining whether a parameter of the second task in the information processing device is dynamically changeable;
      applying and executing the change to the second task in the information processing device by updating the parameter of the second task when the parameter of the second task is determined to be dynamically changeable; and
      upon determining that the change is not confirmed by the management device or upon determining that the parameter of the second task is not dynamically changeable, executing the process flow without applying the change to the second task; and
    in response to determination that the dynamically changeable flag is not attached to the second task, executing the second task without communicating with the management device to confirm whether the change exists in the master process flow.

12. The non-transitory computer-readable medium according to claim 11, wherein
  the communicating with the management device occurs when execution of the second task is started.

13. The non-transitory computer-readable medium according to claim 12, wherein
  the change is applied to the second task when execution of the second task is started.

14. The non-transitory computer-readable medium according to claim 11, wherein
  upon determining that the change is not confirmed by the management device or upon determining that the change is unable to be applied in the information processing device, the information processing device executes the installed process flow without applying the change to the second task.

15. The non-transitory computer-readable medium according to claim 11, wherein
  the parameter of the second task indicates a destination number for a facsimile function.

* * * * *